US008919083B1

(12) United States Patent
Miceli et al.

(10) Patent No.: US 8,919,083 B1
(45) Date of Patent: *Dec. 30, 2014

(54) CUSTOM DISPENSING OF PRESCRIPTION PHARMACEUTICALS

(75) Inventors: David A. Miceli, Spencer, TN (US); Joseph A. Miceli, Spencer, TN (US)

(73) Assignee: Tri State Distribution, Inc., Sparta, TN (US)

(*) Notice: Subject to any disclaimer, the term of this patent is extended or adjusted under 35 U.S.C. 154(b) by 730 days.

This patent is subject to a terminal disclaimer.

(21) Appl. No.: 11/420,348

(22) Filed: May 25, 2006

(51) Int. Cl.
  *B65B 7/28* (2006.01)
  *B65D 50/06* (2006.01)
  *B65B 1/06* (2006.01)

(52) U.S. Cl.
  CPC .............. *B65B 7/2835* (2013.01); *B65D 50/06* (2013.01)
  USPC .............................................. 53/490; 53/471

(58) Field of Classification Search
  USPC ........................................... 53/398, 420, 478
  See application file for complete search history.

(56) References Cited

U.S. PATENT DOCUMENTS

| | | | |
|---|---|---|---|
| 3,478,911 A * | 11/1969 | Hedgewick et al. | 215/222 |
| 3,690,495 A | 9/1972 | Turner | 215/220 |
| 3,795,338 A | 3/1974 | Swartzbaugh et al. | 215/220 |
| 3,797,688 A | 3/1974 | Porcelli et al. | 215/220 |
| 4,011,960 A | 3/1977 | Mauvernay et al. | 215/220 |
| 4,281,771 A | 8/1981 | Siegel | 215/220 |
| 4,285,437 A | 8/1981 | Morris | 215/220 |
| 4,346,809 A | 8/1982 | Kusz | 215/214 |
| 4,433,789 A | 2/1984 | Gibilisco | 215/220 |
| 4,520,938 A | 6/1985 | Finke | 215/220 |
| 4,729,487 A | 3/1988 | Wright | 215/220 |
| 4,854,459 A | 8/1989 | DeJonge | 215/220 |
| 5,082,129 A | 1/1992 | Kramer | 215/221 |
| 5,092,477 A | 3/1992 | Johnson, Jr. et al. | 215/230 |
| 5,148,931 A | 9/1992 | Minh | 215/220 |
| 5,197,616 A | 3/1993 | Buono | 215/220 |
| 5,370,251 A | 12/1994 | Buono | 215/220 |
| 5,449,078 A | 9/1995 | Akers | 215/222 |
| 5,579,934 A | 12/1996 | Buono | 215/220 |
| 5,611,443 A | 3/1997 | King | 215/220 |
| 5,769,252 A * | 6/1998 | Volpe | 215/221 |
| 5,873,475 A * | 2/1999 | Volpe | 215/207 |
| 6,016,930 A * | 1/2000 | Mathes et al. | 215/216 |
| 6,065,648 A * | 5/2000 | Tauber | 222/153.14 |
| 6,681,945 B1 * | 1/2004 | Harrold | 215/204 |
| 6,802,427 B2 | 10/2004 | Miceli et al. | 215/228 |
| 7,000,789 B2 | 2/2006 | Miceli et al. | 215/228 |
| 7,111,746 B2 | 9/2006 | Miceli et al. | |

* cited by examiner

*Primary Examiner* — Stephen F Gerrity
(74) *Attorney, Agent, or Firm* — Luedeka Neely Group, P.C.

(57) ABSTRACT

A pharmaceutical storing and dispensing device including a child resistant mode and a non-child resistant mode between the container and the closure. The closure comprises a non-child resistant cap shaped to removeably engage the container and a child-resistant cap shaped to be permanently fixed to the non-resistant cap. The non-child resistant cap and child resistant cap are provided in intentionally varying quantities such that the quantity of child resistant caps is less than the quantity of non-child resistant caps.

11 Claims, 11 Drawing Sheets

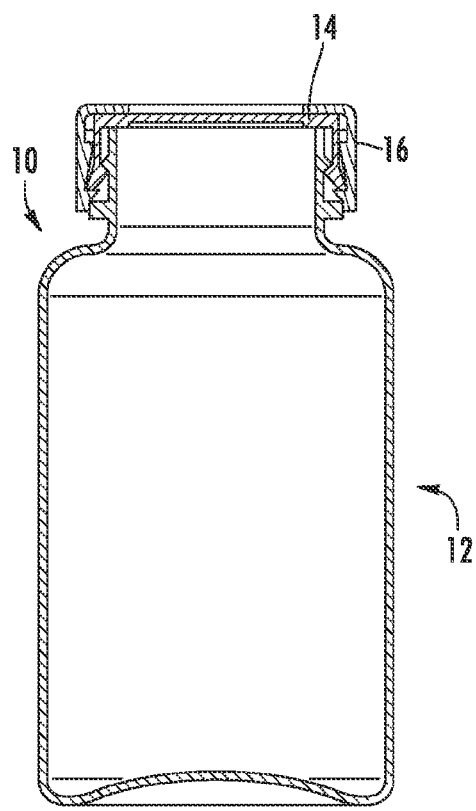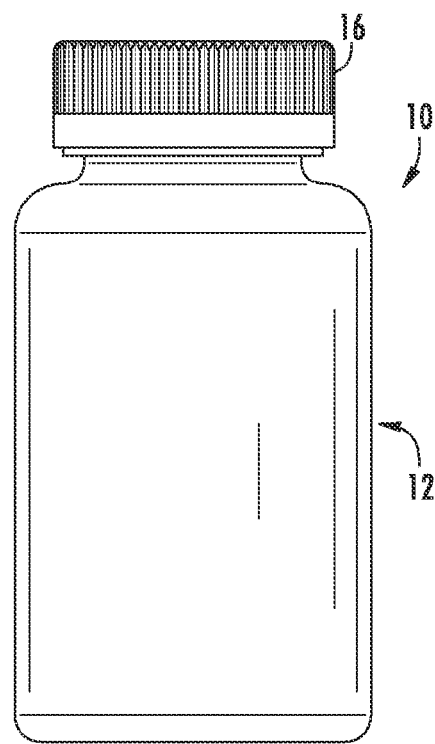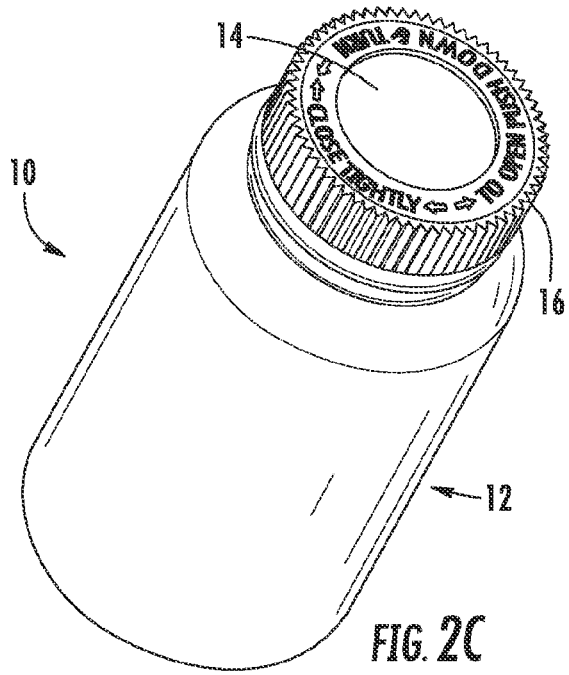

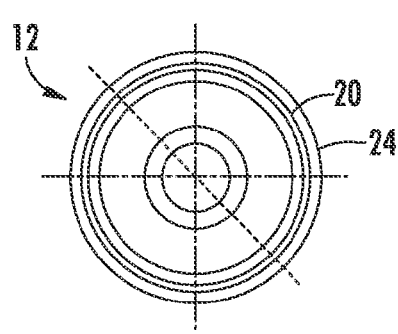
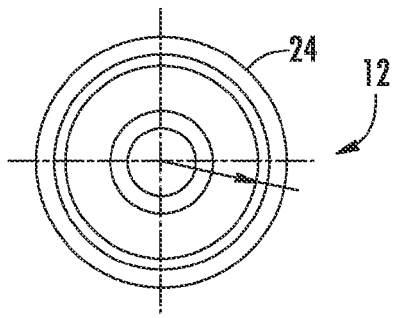
FIG. 3A  FIG. 3B
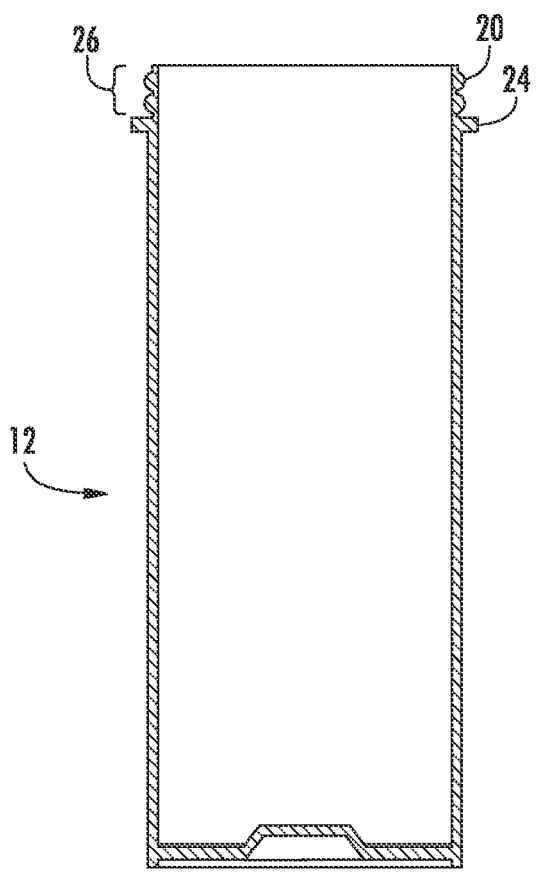
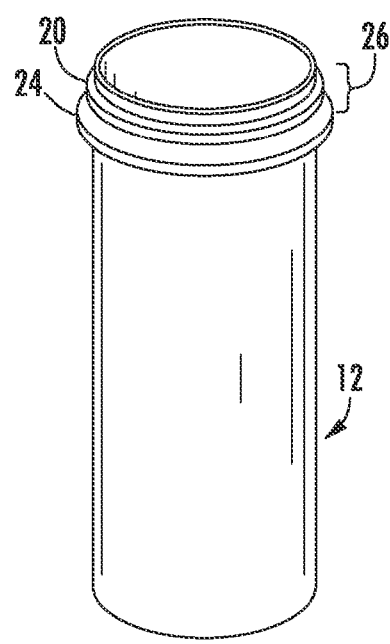
FIG. 3C  FIG. 3D

CUSTOM DISPENSING OF PRESCRIPTION PHARMACEUTICALS

All patents and publications described or discussed herein are hereby incorporated by reference in their entirety.

BACKGROUND OF THE INVENTION

The present invention relates to a closure and container system, or closure and container assembly, for pharmaceuticals. The closure includes child resistant and non-child resistant configurations. The pharmaceuticals system can provide an obstacle for children to remove the closure from the container in the child resistant configuration, while allowing for the ready removal of the closure from the container in the non-child resistant configuration. The closure includes two separate pieces that are designed to be optionally attachable, yet permanently fixed once the pieces are attached. The decision to attach these pieces is preferably made by a person other than the manufacturer, supplier, or distributor of the closure and container system.

There are many types of child resistant closure systems described in the art. An example of a particular type of child resistant closure system is proposed in U.S. Pat. No. 5,449,078, which relates to a combination of a container and safety cap. While many child resistant caps effectively provide protection against the danger of small children being able to remove potentially harmful contents, e.g. pills, from vials or other containers, they also provide a problem for a considerable portion of the adult population that require medication but lack the manual dexterity or strength to remove the child resistant cap. This is of a particular concern to the elderly population or people suffering from arthritis and other disabling diseases.

The most popular type of child-resistant closure is known in the art as a continuous threaded, torque actuated child resistant closure. These caps involve the use of two parts, one of which rests above the other in an axial configuration and which requires both a rotational and downward action to engage for removal. These are used in literally thousands of various applications and packaging configurations due to the universally understood push and turn mechanisms and ease of use and adaptation in a wide variety of automated filing lines and processes. They have become the most prominent and widely accepted solution for packaging requiring child resistant closures. Therefore, any invention designed to overcome the difficulty many senior members of the population experience when attempting to open child-resistant closures should preferably involve, as the basis of its design, a standard two piece, push and turn, torque actuated continuous threaded closure due to their popularity and universal use.

This particular problem has been addressed by the development of closure systems having a child resistant mode and a non-child resistant mode such that, in the non-child resistant mode, the closures are more easily opened by adults. Another example of such a closure is disclosed in U.S. Pat. No. 5,579,934, (the '934 patent). The '934 patent proposes a container closure that is selectively manipulatable between a configuration which resists opening by children and a configuration which may be easily opened without special manipulation of the closure. Specifically, the closure is manipulated into its non-child resistant mode by "pressing down" on the central portion of the top surface of the closure. Although the aforementioned closure provides an advance in the art of protection against the danger of small children being able to remove it from vials or other containers, a certain portion of the adult population lack the manual dexterity or strength to "press down" the central portion of the top surface of the closure so as to manipulate the closure from its child resistant configuration to its non-child resistant configuration. This manipulation or "pushing down" also represents a problem for people with long fingernails.

Other reversible or convertible child resistant closures have been proposed to address this problem. However, these solutions, while making the closure easier to convert into the non-child resistant configuration, increase the risk that the closures will inadvertently be converted into their non-child resistant configurations. Similarly, there is an increased risk that automated filling machines will inadvertently convert the closures into their non-child resistant configurations when applying the closure to the container.

The other form of pharmaceutical closures in the prior art that is convertible between child resistant and non-child resistant mode requires the use of two separate caps that are not designed to be integrated into a single cap. These prior art closures require that a user replace the non-child resistant cap with a child resistant cap, or vice a versa, in order for the closure to switch between child resistant and non-child resistant modes. This requires a pharmacy to maintain two inventories of caps adding costs to the end price for consumers.

Further, the closures of the type disclosed in the '934 patent cannot include a warning to the consumer once the closure has been converted to its non-child resistant configuration. This message is required by the Consumer Product Safety Commission ("CPSC") to alert users that the closure has been converted into the non-child resistant configuration. Also, other reversible child resistant designs that do include the CPSC consumer warning cannot be used in automated dispensing equipment due to projections on their outer surface.

Furthermore, the prior art has shortcomings in the development of child resistant caps including two or more cap elements. For example, an inner cap element nested within an outer cap element and being equipped with an engaging device for rotatably coupling one cap element to the other, as proposed in U.S. Pat. No. 4,520,938, has a substantial risk that children could separate one cap from the other ("shelling") thereby disabling the child resistance mode of operation, especially when the outer cap is made of resilient material such as plastic. Once shelled, there is usually no other safeguard to prevent access to the contents of the container.

Additionally, the multiple element prior art pharmaceutical caps that allow conversion between child resistant and non-child resistant configurations are all provided preassembled. For example, any of the prior art pharmaceutical caps that combine one or more elements into a single cap are provided, or sold, as complete, assembled units and not as individual elements. As such, these prior art convertible pharmaceutical caps require the purchase of an assembled, two element cap regardless of whether or not a convertible cap is actually desired. The end user does not have a choice of the characteristics of the caps. This increases the cost of the pharmaceutical cap, which is either passed on to the consumer or absorbed by the manufacturer.

In light of the foregoing, there is a need for a closure and container system that has both a child resistant and non-child resistant mode. The non-child resistant mode is preferably easy opened without special manipulation, while in the child-resistant mode the system resists any conversion between the two modes. The system should be able to achieve a child-resistant mode that can be optionally obtained by a party other than the manufacturer, such as the pharmacy or the end user, but once obtained should be substantially permanently fixed in that mode. It is not currently contemplated, in either the literature or the industry, to provide pharmaceutical caps to pharmacies or end users as unattached separate elements designed to be integrated into a single cap at the option of the pharmacies or end users.

BRIEF SUMMARY OF THE INVENTION

The present invention is directed to a closure that can substantially obviate one or more of the problems due to limitations and disadvantages of the related art. Additional features and advantages of the invention will be set forth in the description which follows, and in part will be apparent from the description, or may be learned by practice of the invention. The objectives and other advantages of the invention will be further realized and attained by the apparatus particularly pointed out in the written description and claims hereof as well as in the appended drawings.

To achieve these and other advantages and in accordance with the purposes of the invention, as embodied and broadly described, pharmaceutical storing and dispensing device having a closure and a container is taught. The pharmaceutical storing and dispensing device includes a child resistant mode and a non-child resistant mode between the container and the closure.

The closure comprises a non-child resistant element, or cap, shaped to removeably engage the container and a child-resistant element, or cap, shaped to be permanently fixed to the non-child resistant cap. The non-child resistant cap and child resistant element are provided separately based upon consumer demand and desired cap characteristics.

A method of providing a pharmaceutical container and a pharmaceutical cap for the container is taught. The method comprises providing at least one container shaped to hold pharmaceuticals, providing at least one non-child resistant cap shaped to removably engage the container, and providing at least one unattached child resistant element shaped to be permanently fixed to the non-child resistant cap.

A method of selling pharmaceutical containers and pharmaceutical caps for the containers to a pharmacy is also taught. The method comprises selling a plurality of containers shaped to hold pharmaceuticals, selling a plurality of non-child resistant caps shaped to removably engage the containers, and optionally selling a plurality of unattached child resistant elements shaped to be permanently fixed to the non-child resistant caps.

In one embodiment, the non-child resistant cap and child resistant element can be used in intentionally varying quantities such that the quantity of child resistant elements used is less than the quantity of non-child resistant caps used. The containers and non-child resistant caps can be delivered in a first quantity while the child resistant elements can be delivered in a second quantity which is less than the first quantity. This intentional separation in supply or use is facilitated by the capability of a subsequent party, such as a pharmacy, to determine if one of the child resistant elements will be permanently fixed to one of the non-child resistant caps in conjunction with the supply of the pharmaceutical system to the ultimate consumer.

The current invention further includes allowing the pharmacy to determine if or when the child resistant element is permanently fixed to one of the non-child resistant caps. This determination can occur at the pharmacy and can be individual for each child resistant element. Additionally, this determination can be by the actual person wanting the pharmaceuticals to be placed in a container, such as the end pharmaceutical customer, or the person having the prescription filled.

Additionally, if the original quantitative determination of the amount of child resistant elements needed is inaccurate, a third quantity of child resistant elements can be subsequently delivered to meet any additional need or demand for a complete child resistant pharmaceutical system at a given location.

As such, it is a general object of the present invention to provide a method of delivering a pharmaceutical system including pharmaceutical containers and pharmaceutical caps for the containers to the pharmacy.

Another object of the present invention is to deliver a pharmaceutical system having a container and at least two cap elements that are unattached when the pharmaceutical system is delivered.

Still another object of the present invention is to provide varying quantities of independent elements optionally attachable to comprise a pharmaceutical cap and corresponding to a given quantity of pharmaceutical containers.

Another object of the present invention is to supply child resistant elements separately from non-child resistant elements, wherein both of the elements are to be used in conjunction with a pharmaceutical container.

Yet another object of the present invention is to supply a non-child resistant cap that cost less than an assembled convertible dual purpose child resistant/non-child resistant cap for a given pharmaceutical container Another object of the present invention is provide a pharmaceutical cap having at least two attachable elements wherein the elements are sold in varying quantities based upon pharmaceutical consumer needs or desires.

Still another object of the present invention is to provide a pharmaceutical system that allows the end pharmaceutical user to determine whether the system will be child resistant.

Another object of the present invention is to provide a pharmaceutical system that allows a pharmacy to decide whether the system will be child resistant.

Another object of the present invention is to provide a pharmaceutical system comprising a container, a child resistant element and a non-child resistant cap wherein the child resistant element can be selectively and permanently fixed to the non-child resistant cap to make the pharmaceutical system child resistant.

Other and further objects, features and advantages of the present invention will be readily apparent to those skilled in the art upon reading of the following disclosure when taken in conjunction with the accompanying drawings.

It is to be understood that both the foregoing general description and the following detailed description are exemplary and explanatory and are intended to provide further explanation of the invention as claimed.

The accompanying drawings are included to provide a further understanding of the invention and are incorporated in and constitute part of this specification, illustrate several embodiments of the invention and together with the description serve to explain the principles of the invention.

BRIEF DESCRIPTION OF THE SEVERAL VIEWS OF THE DRAWINGS

FIG. 2A is a cross-sectional view of a pharmaceutical system including a container with a non-child resistant cap engaging a child resistant cap.

FIG. 2B is a side view similar to FIG. 2A.

FIG. 2C is a perspective view similar to FIGS. 2A-B.

FIG. 3A is a top view of a container made in accordance with the current disclosure.

FIG. 3B is a bottom view of the container in FIG. 3A.

FIG. 3C is a cross-sectional view of the container similar to FIGS. 3A-B.

FIG. 3D is a perspective view of the container shown in FIGS. 3A-C.

FIG. 5B is a bottom perspective view of the non-child resistant cap shown in FIGS. 5A-5C.

DETAILED DESCRIPTION OF THE INVENTION

Figure 1A:
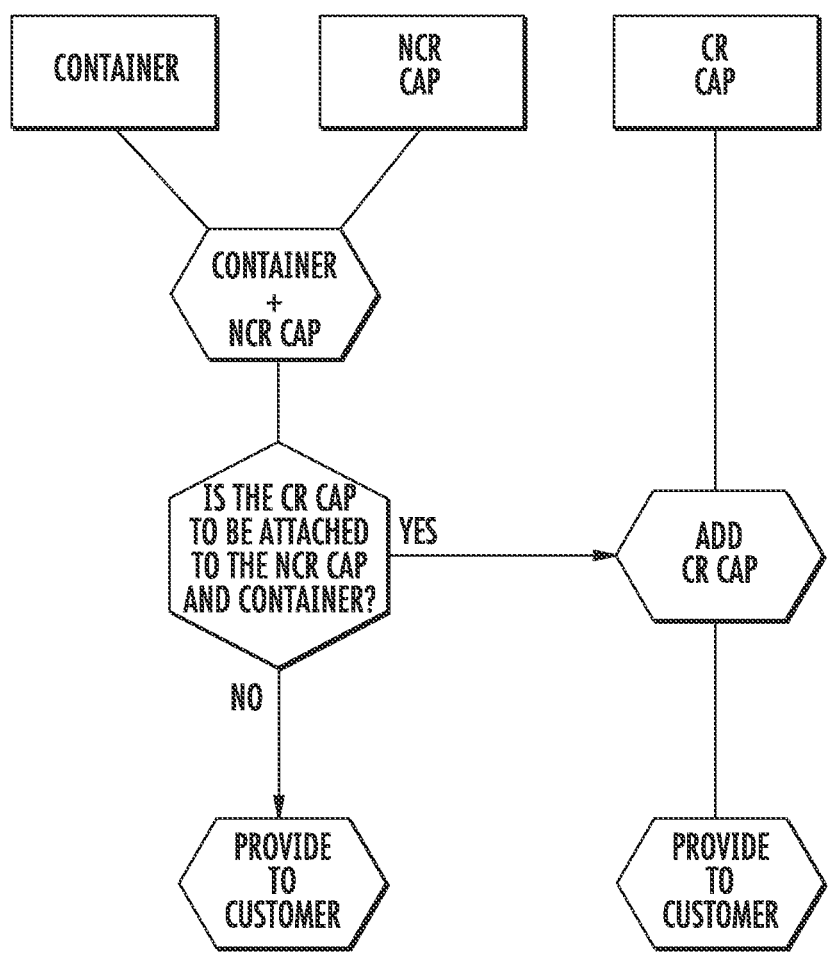
FIG. 1A is a flowchart indicating an example of the delivery methodology associated with the current disclosure.
Figure 1B:
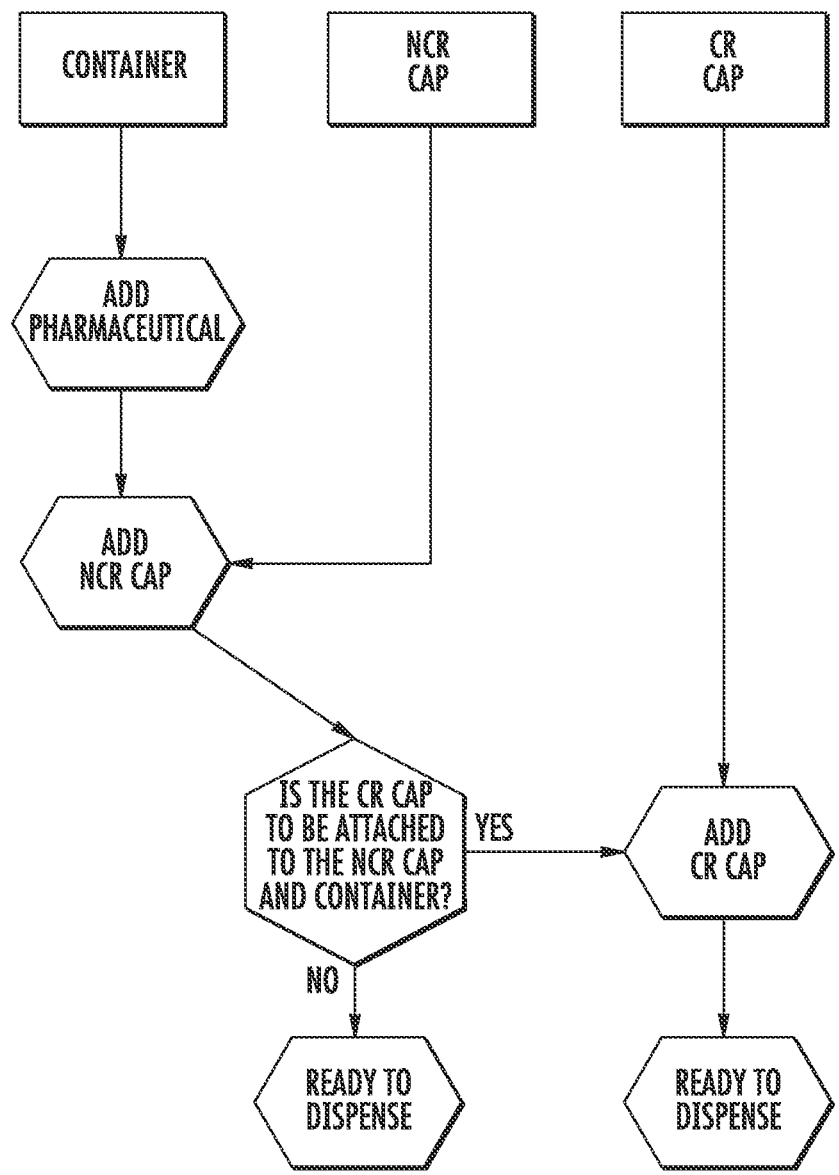
FIG. 1B is a flowchart of a delivery methodology as disclosed herein.

Included herein is a method of delivering pharmaceutical containers 12 and pharmaceutical caps 14 and 16 for the containers 12 to a pharmacy. The container 12 and caps 14 and 16 can be described as a pharmaceutical system 10. The method includes providing at least one container 12 to hold pharmaceuticals, providing at least one non-child resistant cap 14 (NCR Cap) shaped to removeably engage the container 12, and providing at least one unattached child resistant element 16, or child resistant cap 16, (CR Element) shaped to be permanently fixed to the NCR cap 14.

A method of selling pharmaceutical containers 12 and pharmaceutical caps, comprising 14 and 16, for the containers 12 to a pharmacy is also taught. The method comprises selling a plurality of containers 12 shaped to hold pharmaceuticals, selling a plurality of non-child resistant caps 14 shaped to removably engage the containers 12, and optionally selling a plurality of unattached child resistant elements 16 shaped to be permanently fixed to the non-child resistant caps 14. The CR Elements 16 are designed to be integrated with the NCR Cap 14 and preferably include a design that lacks the capacity to be attached to the container 12 independent of the NCR Cap 14.

The steps of providing or selling the plurality of unattached CR Elements 16 is preferably based upon the use of those CR Elements 16 by the pharmacy or pharmaceutical user. This use can be quantified by the fact that one of the NCR caps 14 is used with each container 12 while one of the CR Elements 16 is optionally used based upon consumer driven demand.

As such, the second quantity of CR Elements 16 can be less than the first quantity of NCR caps 14 and containers 12. For example, in one embodiment the quantity of CR Elements 16 is approximately less than 50% of the quantity of NCR Caps 14. In alternate embodiment, the second quantity of CR Elements 16 is approximately less than 20% of the first quantity of NCR caps 14. Additionally, a third quantity of CR Elements 16 can be delivered subsequently to the delivery of the second quantity such that the third quantity of the CR Elements 16 is less than the second quantity of CR Elements 16.

These variances in quantities are facilitated by the option of a subsequent party, such as the pharmacy, pharmacist, pharmaceutical customer, medical prescription patient, and the like, to decide whether the pharmaceutical system 10 has child resistant capabilities. Namely, an individual substantially unrelated to the manufacture of the pharmaceutical system 10 has the ability to decide whether the individual elements of pharmaceutical system 10 are assembled. This ability to decide facilitates the ability of a person or entity to establish post-manufacture, and more specifically, after the pharmaceutical system 10 leaves the manufacturer's control, whether the pharmaceutical system 10 will have child resistant characteristics.

Alternately stated, at least the first user of the pharmaceutical system has the capability of deciding whether to assemble the child resistant element 16 with the non-child resistant cap 14 in order to make a pharmaceutical system 10 comprising a container 12, non-child resistant cap 14 and child resistant element 16. This combination would make the pharmaceutical system 10 child resistant. Alternately, at least that first user of the pharmaceutical system can decide not to attach the child resistant element 16 to the non-child resistant cap 14 thus making the pharmaceutical system not possess child resistant characteristics and comprise the container 12 and the non-child resistant cap 14 without the child resistant element 16.

The current method is further enhanced by the fact that at least the first user of the pharmaceutical system 10 after manufactured control has been relinquished has the ability to determine the characteristics of the pharmaceutical system 10. For example, a pharmacy can decide to preassemble NCR Caps 14 on containers 12 and decide on an individual basis whether any of those preassembled combinations will have a child-resistant element 16. Additionally, the determination can be by the pharmaceutical patient who can choose not to have child resistant characteristics in their pharmaceutical system due to a lack of small children at their home that could be exposed to a potential health risk by the pharmaceuticals in the pharmaceutical system 10 or the inability to open a child resistant system.

An advantage of the methods taught by this disclosure includes the fact that the pharmacy can reduce costs by only supplying a child resistant pharmaceutical system when desired by the ultimate consumer. This reduces the amount of overhead to the pharmacy, storage capacity need for the pharmaceutical systems, and the material amounts associated with each pharmaceutical system 10, thereby reducing the overall costs to the pharmacy.

Additionally, an end user that has difficulty opening a child resistant pharmaceutical system can option to not have this characteristic. For example, this is very useful for pharmaceutical patients that suffer from arthritis in their hands, have other physical ailments that do not facilitate operating the child-resistant mechanisms on pharmaceutical systems, or otherwise do not need a system with child resistant characteristics.

However, if a child resistant pharmaceutical system is desired, the child resistant element 16 is designed to be permanently fixed to the non-child resistant cap 14. This reduces any unwanted shelling or removal of the child resistant element 16 from the non-child resistant cap 14 thereby facilitating the safe characteristics of a child resistant pharmaceutical system 10 and protecting at risk individuals from unwanted access to the pharmaceuticals contained therein.

Figure 5A:
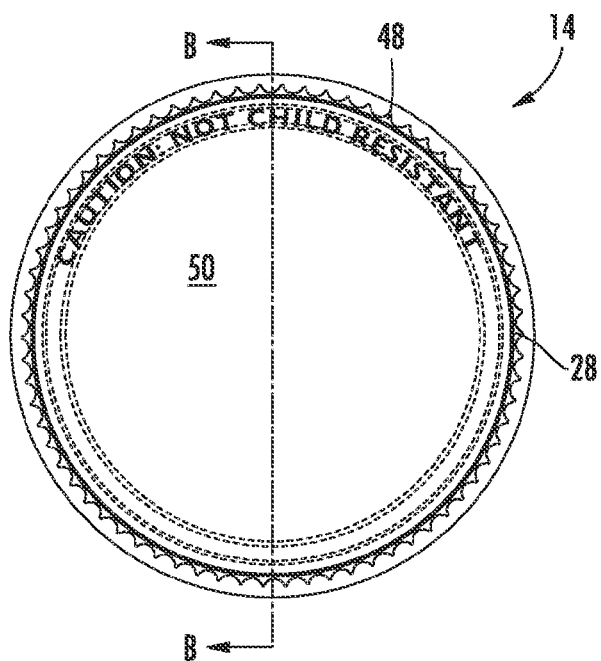
FIG. 5A is a top view of a non-child resistant cap made in accordance with the current disclosure.
Figure 5B:
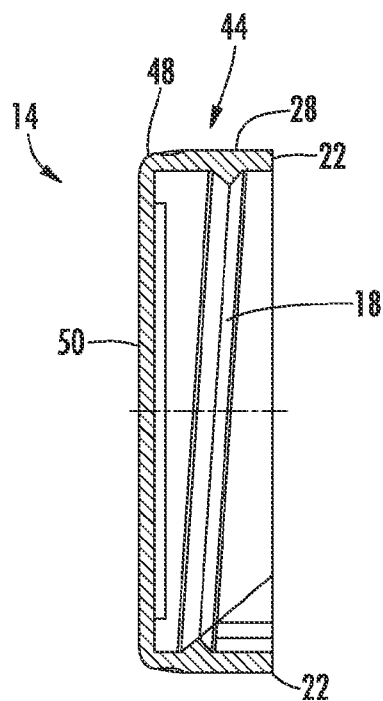
FIG. 5B is a close-sectional view taken along line B-B of FIG. 5A.
Figure 5C:
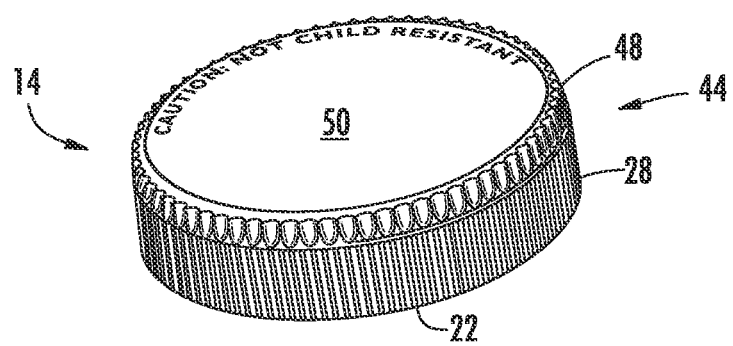
FIG. 5C is a top perspective view of the non-child resistant cap shown in FIGS. 5A-5B.
Figure 5D:
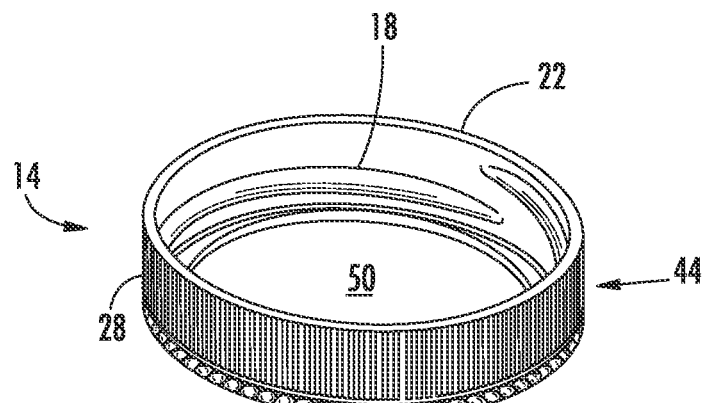
FIG. 5E is a side view of the non-child resistant cap shown in FIGS. 5A-B.
FIG. 5F is an alternate top perspective view of the non-child resistant cap shown in FIGS. 5A-B.
Figure 5E:
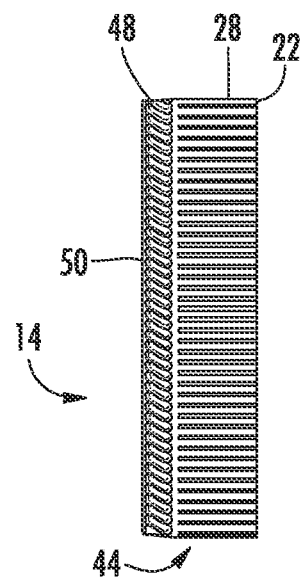
Figure 5F:
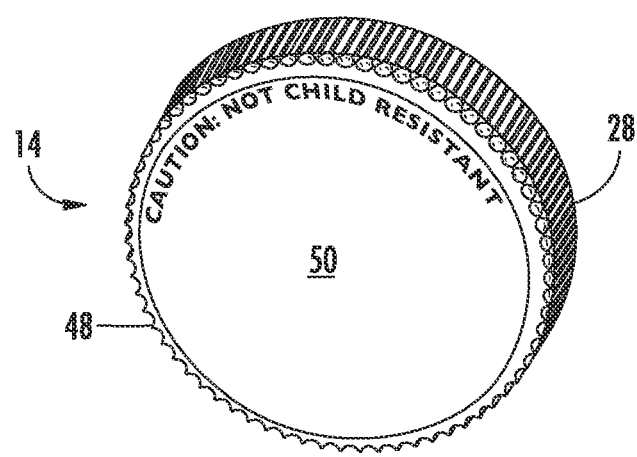

These inventive methods are facilitated by the construction of the pharmaceutical system 10. In a preferred embodiment the NCR Cap 14, as exampled in FIGS. 5A-5F, includes an attachment device 18, which can be a single thread, double thread, one or more beads, or other similar attachment methods known in the art. The attachment device 18 interacts with the fastener 20 on the container 12 in conventional manners to secure the NCR Cap 14 to the container 12. The bottom 22 of NCR Cap 14 can rest on the angular ring 24 on the neck 26 of the container 12. Alternately, and more preferably, the bottom 22 can be suspended above the angular ring 24 by the attachment device 18 and the fastener 20. The NCR Cap 14 can include a gripping element 28, such as knurlments, to provide a gripping surface for opening the NCR Cap 14.

Figure 4A:
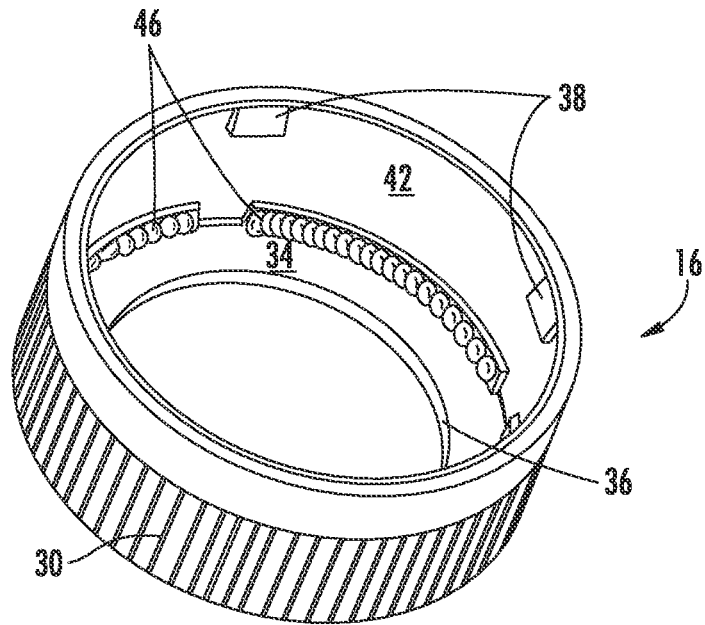
FIG. 4A is a bottom perspective view of a child resistant element made in accordance with the current disclosure.
Figure 4B:
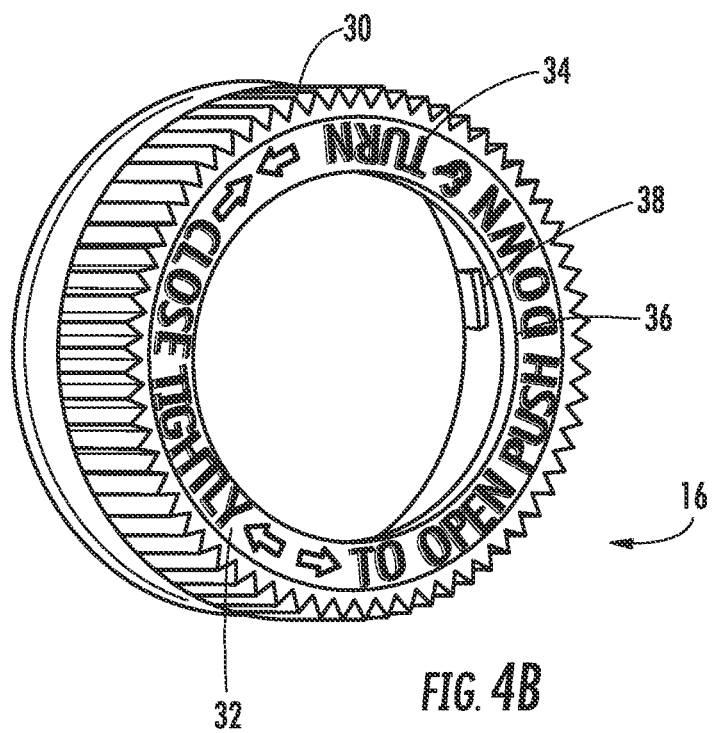
FIG. 4B is a top perspective view of the child resistant element of FIG. 4A.
Figure 4C:
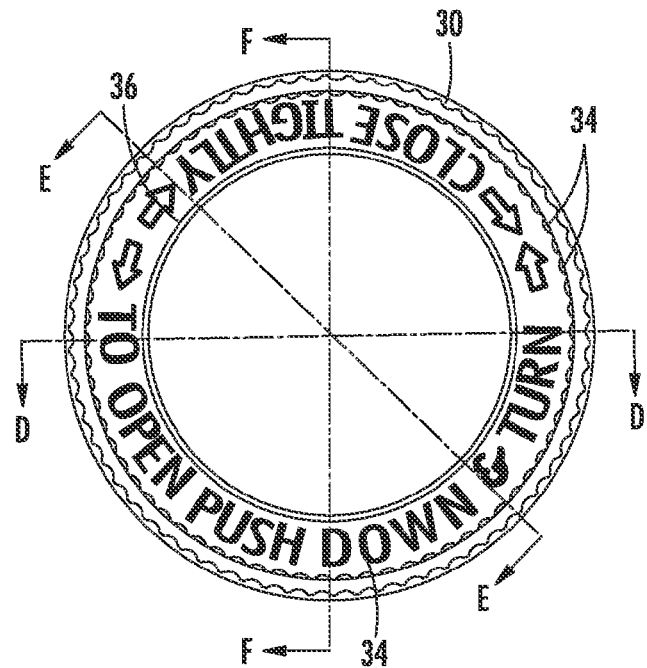
FIG. 4C is a top view of a child resistant element shown in FIGS. 4A-B.
Figure 4D:
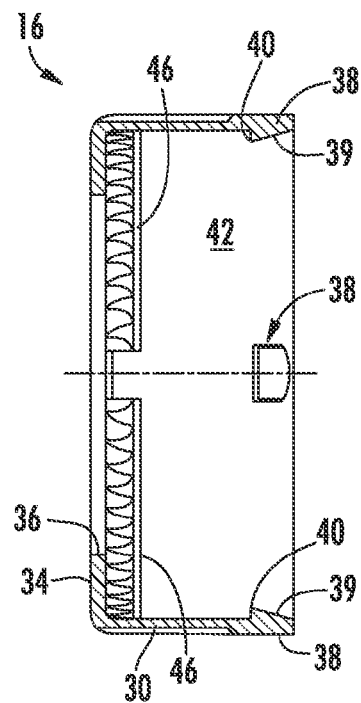
FIG. 4D is a cross-sectional view taken along line D-D of FIG. 4C.
Figure 4E:
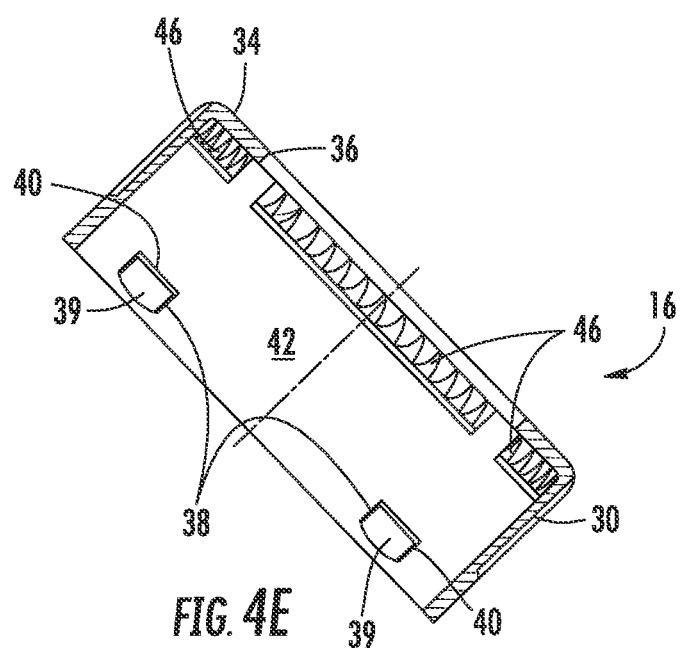
FIG. 4E is a cross-sectional view taken along line E-E of FIG. 4C.
Figure 4F:
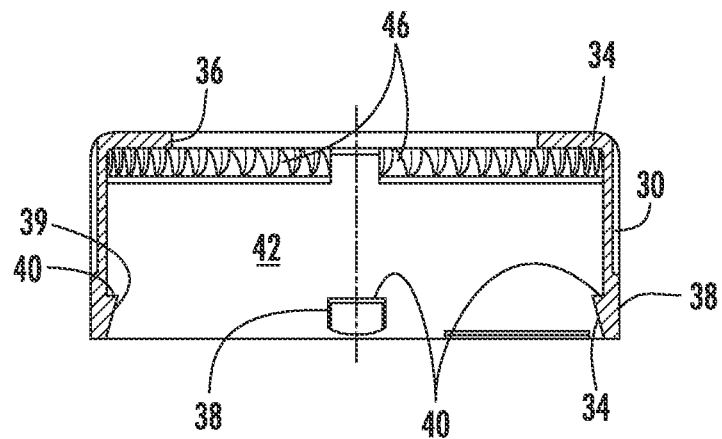
FIG. 4F is a cross-sectional view taken along line F-F of FIG. 4C.
Figure 4G:
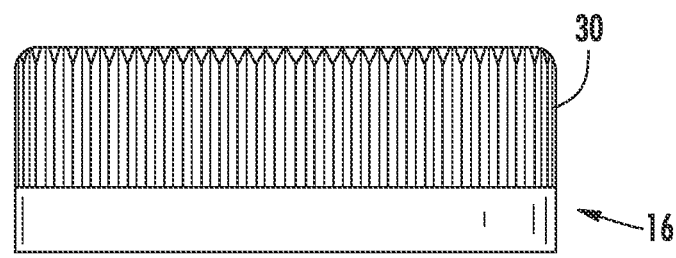
FIG. 4G is a side view of the child resistant element shown in FIGS. 4A-4F.

The child resistant element 16 is exampled in FIGS. 4A-4G. The CR Element 16 can include gripping elements 30, which can also be described as knurlments, used to facilitate the rotation of the CR Element 16. Additionally, indicia 32 can be printed on the top surface 34 of the CR Element 16, wherein the indicia give instructions on how to open the CR Element 16. The CR Element 16 is shown in the Figures having an open top 34, but alternately can have a solid top not allowing view of the NCR Cap 14. The rim 36 shown in FIGS. 4A-4F can be used to cover indicia on the NCR Cap 14. Those indicia on the NCR Cap 14 can include such warnings as "Caution Not Child Resistant." The rim 36 can be designed to cover the indicia on the NCR Cap 14. The top 34, if solid, can cover any indicia on the NCR Cap 14 when the CR Element 16 and NCR Cap 14 are attached.

The CR Element 16 includes at least one protrusion 38, which can be described as an internal tab, engaging the bottom 22 of the NCR Cap 14. The internal tabs 38 are angled and include a substantially flat surface 40 that engages the bottom 22 of the NCR Cap 14 to fix the CR Element 16 to the NCR Cap 14. In a preferred embodiment there are four internal tabs 38 spaced around the internal wall 42 of the CR Element 16. The angled portion 39 of the tabs 38 facilitates the CR Element 16 traversing the external wall (referring to wall with knurlments 28 thereon) of the NCR Cap 14.

The height of the NCR Cap 14 can be less than the distance from the flat surface 40 to the top 34. This spatial configuration facilitates the selective engagement of teeth 46 positioned near the engagement between the internal wall 42 and top 34 of the CR Element 16. The teeth 46 interact with corresponding teeth 48 on the NCR Cap 14. The teeth 48 of the NCR Cap 14 are positioned opposite the bottom 22 and near the top 50 of the NCR Cap 14. The teeth 48 can be an extension of the knurlments 28, or can be separate items on the NCR Cap 14.

In operation, since the height of the NCR Cap 14 is less than the distance between the flat surface 40 and the teeth 46 of the CR Element 16, simply trying to turn the CR Element 16 without a depressive force will facilitate a traversing motion of the teeth 46 across the teeth 48. Without pressure applied in a downward direction on the CR Element 16, the teeth 46 CR Element 16 will not engage the teeth 48 on the NCR Cap 14. As such the NCR Cap 14, which is attached to the container will not rotate and open. However, when the downward pressure is applied to the CR Element 16 the teeth 46 engage the teeth 48 of the NCR Cap 14 to rotate and become disengaged from the container 12 to allow access to the pharmaceuticals therein.

An advantage of this current system is the fact that the conversion of a pharmaceutical system 10 from a system having non-child resistant characteristics to a system having child resistant characteristics does not require the replacement of parts within the pharmaceutical system 10. The current disclosure teaches that the selective addition of a child resistant cap that can be affixed to a non-child resistant cap adds to the pharmaceutical system a child resistant characteristic.

Thus, although there have been described particular embodiments of the present invention of a new and useful An Optionally Attachable, Permanently Fixed Two Piece Container Cap, it is not intended that such references be construed as limitations upon the scope of this invention except as set forth in the following claims.

What is claimed is:

1. A method of customizing the dispensing from a pharmacy of a prescription pharmaceutical for a customer in a pharmaceutical container, the method comprising the steps of:
   providing a quantity of a pharmaceutical system at the pharmacy, the system comprising:
   a non-child resistant cap shaped to screw on and off the container, and a child resistant element that is separate from the non-child resistant cap and is configured so as to be able to be permanently assembled with the non-child resistant cap to permanently convert the non-child resistant cap to a child resistant cap, wherein the child resistant element when assembled with the non-child resistant cap will rotate on and relative to the non-child resistant cap in a first mode of operation in which a depressive force is not applied to the child resistant element, and wherein the child resistant element when assembled with the non-child resistant cap will engage the non-child resistant cap and drive the non-child resistant cap in a rotating motion to unscrew the non-child resistant cap from the container in a second mode of operation in which a depressive force is applied to the child resistant element;
   determining whether the customer wants the child resistant cap or the non-child resistant cap on the container for the prescription of the customer;
   dispensing the prescription pharmaceutical in the container having the non-child resistant cap when the customer does not want the child resistant cap; and
   permanently non-reversibly converting the non-child resistant cap to a push-down-and-turn child resistant cap by assembling at the pharmacy the child resistant element with the non-child resistant cap and dispensing the prescription pharmaceutical in the container having the push-down-and-turn child resistant cap when the customer wants the child resistant cap.

2. The method of claim 1, wherein the container for containing the pharmaceuticals is void of any locking projections extending from the container for contacting the child resistant element.

3. The method of claim 1 further comprising applying the non-child resistant cap to the container before the permanently non-reversibly converting step.

4. A method of customizing the dispensing by a pharmacy of a prescription pharmaceutical in a pharmaceutical container, the method comprising the steps of:
   providing a quantity of a pharmaceutical system at the pharmacy, the system comprising:
   a non-child resistant cap shaped to screw on and off the container and including thereon warning indicia that the non-child resistant cap is not child resistant, and a child resistant element that is separate from the non-child resistant cap and is configured so as to be able to be permanently non-reversibly assembled with the non-child resistant cap to permanently non-reversibly convert the non-child resistant cap to a push down and turn child resistant cap and to cover the warning indicia on the non-child resistant cap, determining whether the customer wants the child resistant cap or the non-child resistant cap on the container for the prescription of the customer;

dispensing the prescription pharmaceutical in the container having the non-child resistant cap when the customer does not want the child resistant cap; and permanently non-reversibly converting the non-child resistant cap to the child resistant cap and covering the warning indicia on the non-child resistant cap by assembling at the pharmacy the child resistant element with the non-child resistant cap and dispensing the prescription pharmaceutical in the container having the child resistant cap when the customer wants the child resistant cap.

5. The method of claim 4 further comprising applying the non-child resistant cap to the container before the permanently non-reversibly converting step.

6. A method of reducing pharmacy costs, the method comprising the steps of:

maintaining at a pharmacy containers for containing prescription pharmaceuticals;

providing a pharmaceutical cap system at the pharmacy for dispensing prescription pharmaceuticals, the cap system comprising:

a non-child resistant cap having a threaded interior sidewall shaped to screw on and off the container and having a top and an external sidewall, the external sidewall having an edge that extends continuously around the circumference of the external sidewall, and a child resistant element separate from the non-child resistant cap and being configured so as to be able to be assembled with the non-child resistant cap to convert the non-child resistant cap to a push-down-and-turn child resistant cap, the child resistant element having a child resistant element top, an interior sidewall depending from the top and including a plurality of spaced apart internal tabs, the tabs being spaced equidistantly from the top of the child resistant element, each tab having a first surface that is angled to facilitate the interior sidewall of the child resistant element traversing the external sidewall of the non-child resistant cap and a second surface that engages the edge of the non-child resistant cap when the child resistant element is assembled with the non-child resistant cap, wherein the child resistant element when assembled with the non-child resistant cap will rotate on and relative to the non-child resistant cap in a first mode of operation in which a depressive force is not applied to the child resistant element, and wherein the child resistant element when assembled with the non-child resistant cap will engage the non-child resistant cap and drive the non-child resistant cap in a rotating motion to unscrew the cap from the container in a second mode of operation in which a depressive force is applied to the child resistant element, determining whether the customer wants the child resistant cap or the non-child resistant cap on the container for the prescription pharmaceuticals of the customer;

dispensing the prescription pharmaceuticals in the container having the non-child resistant cap when the customer does not want the child resistant cap;

permanenty non-reversibly converting the non-child resistant cap to the push-down-and-turn child resistant cap at the pharmacy by positioning the child resistant element co-axially with respect to the non-child resistant cap, positioning the child resistant element in any radial orientation with respect to the non-child resistant cap, and sliding the interior sidewall of the child resistant element over the external sidewall of the non-child resistant cap until the second surfaces on the tabs pass beyond the edge of the non-child resistant cap when the customer wants a child resistant cap; and dispensing the prescription pharmaceutical in the container having the push-down-and-turn child resistant cap when the customer wants the child resistant cap.

7. The method of claim 6, wherein the edge of the non-child resistant cap comprises a bottom of the non-child resistant cap.

8. The method of claim 6, wherein the child resistant element is incapable of being attached to the container absent being assembled with the non-child resistant cap.

9. The method of claim 6, wherein, the child resistant element has a height defined between the second surfaces of the internal tabs and an interior surface of the top of the child resistant element that is greater than a height of the non-child resistant cap, and the child resistant element includes driving structures proximate to the interior surface of the top of the child resistant element and the non-child resistant cap includes driven structures proximate an exterior surface of the top of the non-child resistant cap, and the non-child resistant cap is removed from the container when the non-child resistant cap is installed on the container with the child resistant element assembled therewith by application of pressure in a direction toward the container to the child resistant element to engage the driving structures of the child resistant element with the driven structures of the non-child resistant cap and rotate the non-child resistant cap to unthread the non-child resistant cap and move the non-child resistant cap away from the container.

10. The method of claim 6, wherein the container for containing the pharmaceuticals is void of any locking projections extending from the container for contacting the child resistant element.

11. The method of claim 6 further comprising applying the non-child resistant cap to the container before the permanently non-reversibly converting step.

* * * * *